United States Patent
Waid et al.

(10) Patent No.: US 7,474,962 B2
(45) Date of Patent: Jan. 6, 2009

(54) METHODS AND SYSTEMS OF RELATIVE NAVIGATION FOR SHIPBOARD LANDINGS

(75) Inventors: James Waid, Bradenton, FL (US); Kevin Dutton, Clearwater, FL (US); Adam Boseley, Treasure Island, FL (US); Kenneth S. Morgan, St. Petersburg, FL (US); Phil Hess, New Port Richey, FL (US); Michael Vaujin, Safety Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 53 days.

(21) Appl. No.: 11/180,295

(22) Filed: Jul. 13, 2005

(65) Prior Publication Data

US 2007/0016371 A1 Jan. 18, 2007

(51) Int. Cl.
*G01C 21/00* (2006.01)

(52) U.S. Cl. .................. 701/213; 701/120; 701/214; 701/216; 701/220; 342/33; 342/35; 342/107; 342/108; 342/113; 342/195; 342/132; 342/134; 342/357.08; 342/357.14; 340/945; 340/948; 340/961

(58) Field of Classification Search ............. 340/945, 340/948, 961, 981; 342/36, 357, 2, 26, 29, 342/33, 63, 35, 107, 108, 113, 195, 132, 342/134, 357.08, 357.14; 434/28, 37, 372, 434/38, 46, 48, 49, 51, 52, 59; 446/230, 446/30, 33, 88; 701/213, 214, 216, 220, 701/120

See application file for complete search history.

(56) References Cited

U.S. PATENT DOCUMENTS

| | | | | |
|---|---|---|---|---|
| 4,032,759 A | * | 6/1977 | Danik | 701/220 |
| 4,232,313 A | * | 11/1980 | Fleishman | 342/36 |
| 5,432,520 A | * | 7/1995 | Schneider et al. | 342/357.14 |
| 5,438,337 A | * | 8/1995 | Aguado | 342/357.08 |
| 5,488,563 A | * | 1/1996 | Chazelle et al. | 701/301 |
| 5,570,097 A | * | 10/1996 | Aguado | 342/357.06 |
| 5,638,282 A | * | 6/1997 | Chazelle et al. | 701/301 |
| 5,702,070 A | * | 12/1997 | Waid | 244/183 |
| 5,757,317 A | | 5/1998 | Buchler et al. | |
| 6,246,960 B1 | * | 6/2001 | Lin | 701/214 |
| 6,598,009 B2 | * | 7/2003 | Yang | 702/152 |
| 6,831,599 B2 | * | 12/2004 | Morgan | 342/357.14 |
| 6,836,707 B2 | * | 12/2004 | Sowada et al. | 701/21 |
| 2002/0029110 A1 | * | 3/2002 | Fukuda et al. | 701/213 |

(Continued)

OTHER PUBLICATIONS

Min Kao, Eller, D. Automatic Control, IEEE Transactions on Publication Date: Mar. 1983 vol. 28, Issue: 3 On pp. 304-314.*

(Continued)

*Primary Examiner*—Khoi H. Tran
*Assistant Examiner*—Jorge O Peche (57) ABSTRACT

A method for guiding the approach and landing of an aircraft is provided. The method involves receiving navigation information from the aircraft, receiving navigation information from an aircraft carrier, integrating the navigation information from the aircraft with the navigation information from the aircraft carrier to determine a relative velocity and a relative position between the aircraft and the aircraft carrier, and propagating the relative velocity and the relative position forward in time for navigation purposes.

31 Claims, 4 Drawing Sheets

U.S. PATENT DOCUMENTS

| | | | |
|---|---|---|---|
| 2002/0033769 A1* | 3/2002 | Bass et al. | 342/418 |
| 2002/0050943 A1* | 5/2002 | Toda et al. | 342/357.04 |
| 2002/0120400 A1* | 8/2002 | Lin | 701/214 |
| 2002/0196185 A1* | 12/2002 | Bloy | 342/435 |
| 2003/0040852 A1* | 2/2003 | Green et al. | 701/13 |
| 2003/0154049 A1* | 8/2003 | Toda | 702/151 |
| 2004/0036650 A1* | 2/2004 | Morgan | 342/357.14 |
| 2005/0055143 A1* | 3/2005 | Doane | 701/30 |
| 2005/0114023 A1* | 5/2005 | Williamson et al. | 701/214 |
| 2005/0211083 A1* | 9/2005 | Waid et al. | 89/1.11 |
| 2006/0074558 A1* | 4/2006 | Williamson et al. | 701/213 |

OTHER PUBLICATIONS

Kim, J.; Jee, G.-I.; Lee, J.G.; A complete GPS/INS integration technique using GPS carrier phase measurements Position Location and Navigation Symposium, IEEE 1998 Apr. 20-23, 1998 pp. 526-533.*

De Lorenzo, D.S. Alban, S. Gautier, J. Enge, P. Dept. of Aeronaut. & Astronaut., Stanford Univ., CA, USA; This paper appears in: Position Location and Navigation Symposium, 2004. PLANS 2004 Publication Date: Apr. 26-29, 2004 On pp. 762-770.*

De Lorenzo et al., "GPS Attitude Determination for a JPALS Testbed: Integer Initialization and Testing," Apr. 2004, IEEE Position Location and Navigation Symposium, Monteray, CA.

Bosely et al., "Demonstration System For Using Shipboard-Relative GPS," GPS World, Apr. 1, 2005.

* cited by examiner

METHODS AND SYSTEMS OF RELATIVE NAVIGATION FOR SHIPBOARD LANDINGS

GOVERNMENT LANGUAGE

This invention was made with government support under contract no. F33657-99-C-2040 awarded by the United States Army/Navy Sea Based JPALS/SBJPALS EGI Program. The government has certain rights in this invention.

TECHNICAL FIELD

The present invention relates to methods of navigation, and in particular, methods of avionic navigation.

BACKGROUND

Existing requirements for providing precision approach and landing navigation during flight for both commercial and military aircraft include accuracy, integrity, availability, and continuity of function. Traditionally, location determination incorporates the use of global positioning system (GPS)-based satellite navigation that can provide accuracy down to the centimeter level. Integrity of the navigation system is typically expressed in terms of confidence levels. The higher the confidence level, the more reliable the information provided. Availability and continuity provide assurances that the system will be available not only at the beginning of the operation, but throughout the entire duration of the flight.

Meeting these requirements is especially crucial for autonomous shipboard landings on seaborne aircraft carriers. Proposals of using GPS to generate relative navigation and guidance to meet these challenges can provide the accuracy and integrity required, however, a shipboard approach and landing is more demanding than typical land-based approaches and landings. Aircraft navigation systems used in a shipboard approach and landing must continue to meet the requirements listed above even at sea under severe weather conditions and demanding electromagnetic environments. This is particularly important when landing on an aircraft carrier, where vertical landing errors of more than 0.3 meters is unacceptable and can result in unsafe landing conditions.

Some of the factors to consider during autonomous shipboard landings are a lack of visibility, operating under combat conditions, and a dynamically changing touchdown point. Another factor to consider is that any type of navigational aid must include velocity determination, since both the aircraft and the aircraft carrier are in motion relative to one another. In addition to low rate GPS measurement data other, higher rate, measurements are needed in order to evaluate the relative state between aircraft and aircraft carrier, i.e., the aircraft's position and velocity with respect to the moving runway and touchdown point, as accurately as possible during a precision approach and landing. Existing navigational aids include using an inertial navigation system (INS) to measure the position and altitude of the approaching aircraft in conjunction with GPS. With a combination GPS/INS solution, the short-term measurement data from the INS, which is susceptible to drift errors over time, is corrected by the exact location and time references provided by satellite navigation. In addition, since INS operates in reference to the inertial movements of the system, it is immune to detection or jamming.

GPS-only methods of relative navigation, however, are susceptible to jamming (intentional) and interference (unintentional) which can severely impact the operation. For example, loss of the GPS navigational signal as the aircraft is nearing the landing area could result in a devastating loss. Moreover, current ship-based methods do not always provide a secure transmission link, leaving either the aircraft or aircraft carrier vulnerable to detection.

For the reasons stated above and for other reasons stated below which will become apparent to those skilled in the art upon reading and understanding the specification, there is a need in the art for an improved method of avionic navigation.

SUMMARY

In one embodiment, a method for providing relative navigation between two objects includes receiving navigation information from the first object, receiving navigation information from the second object, integrating the navigation information from the first object with the navigation information from the second object to determine a relative velocity and a relative position between the first and second objects, and propagating the relative velocity and the relative position forward in time for navigation purposes.

In another embodiment, a method for guiding the approach and landing of an aircraft is provided. The method involves receiving navigation information from the aircraft, receiving navigation information from an aircraft carrier, integrating the navigation information from the aircraft with the navigation information from the aircraft carrier to determine a relative velocity and a relative position between the aircraft and the aircraft carrier, and propagating the relative velocity and the relative position forward in time for navigation purposes.

In yet another embodiment, a computer-readable medium having computer-executable program instructions for a method for determining relative position and relative velocity between an aircraft and an aircraft carrier as the aircraft approaches the aircraft carrier is provided. The method includes integrating the attitude and position of the aircraft carrier with the attitude and position of the aircraft, integrating the velocity of the aircraft carrier with the velocity of the aircraft, and constructing the reference trajectories for relative position and velocity.

In yet another embodiment, an on-board navigational system for an aircraft is provided. The system includes a first processor adapted to perform real-time computations necessary for recording absolute measurements of the aircraft's position and velocity, wherein the processor is further adapted to integrate position and velocity measurements with respect to the aircraft, a second processor adapted to perform real-time computations necessary for receiving position and velocity measurements from an aircraft carrier, wherein the processor is further adapted to estimate position and velocity errors with respect to the aircraft, estimate position and velocity errors with respect to the aircraft carrier, and estimate the relative position and velocity between the aircraft carrier and the aircraft, one or more position sensors coupled to the first processor, the sensors adapted to detect the position of the aircraft, one or more inertial sensors coupled to the first processor; the sensors adapted to detect the inertial movements of the aircraft, and a navigation avionics platform, coupled to both the first and second processors, wherein the platform is further adapted to provide ship state and GPS measurement data from the aircraft carrier to the second processor, and to receive relative navigation data from the second processor.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention may be implemented with present navigation avionics technologies as well as current satellite guidance and other forms of navigation technology. This description is presented with enough detail to provide an understanding of the present invention, and should not be construed to encompass all necessary elements in an avionic navigation system.

Although the examples of embodiments in this specification are described in terms of aircraft approach and landing aboard aircraft carriers, embodiments of the present invention are not limited to applications of aircraft approach and landing aboard aircraft carriers. Embodiments of the present invention are applicable to any aircraft approach and landing activity that requires the use of relative navigation to supplement a precision approach and landing of an aircraft when standard navigational aids become momentarily disrupted or are no longer made available. Alternate embodiments of the present invention to those described below utilize a method of relative navigation to determine the relative position and velocity between an aircraft and an aircraft carrier than can be propagated forward in time for navigation purposes.

Figure 1:
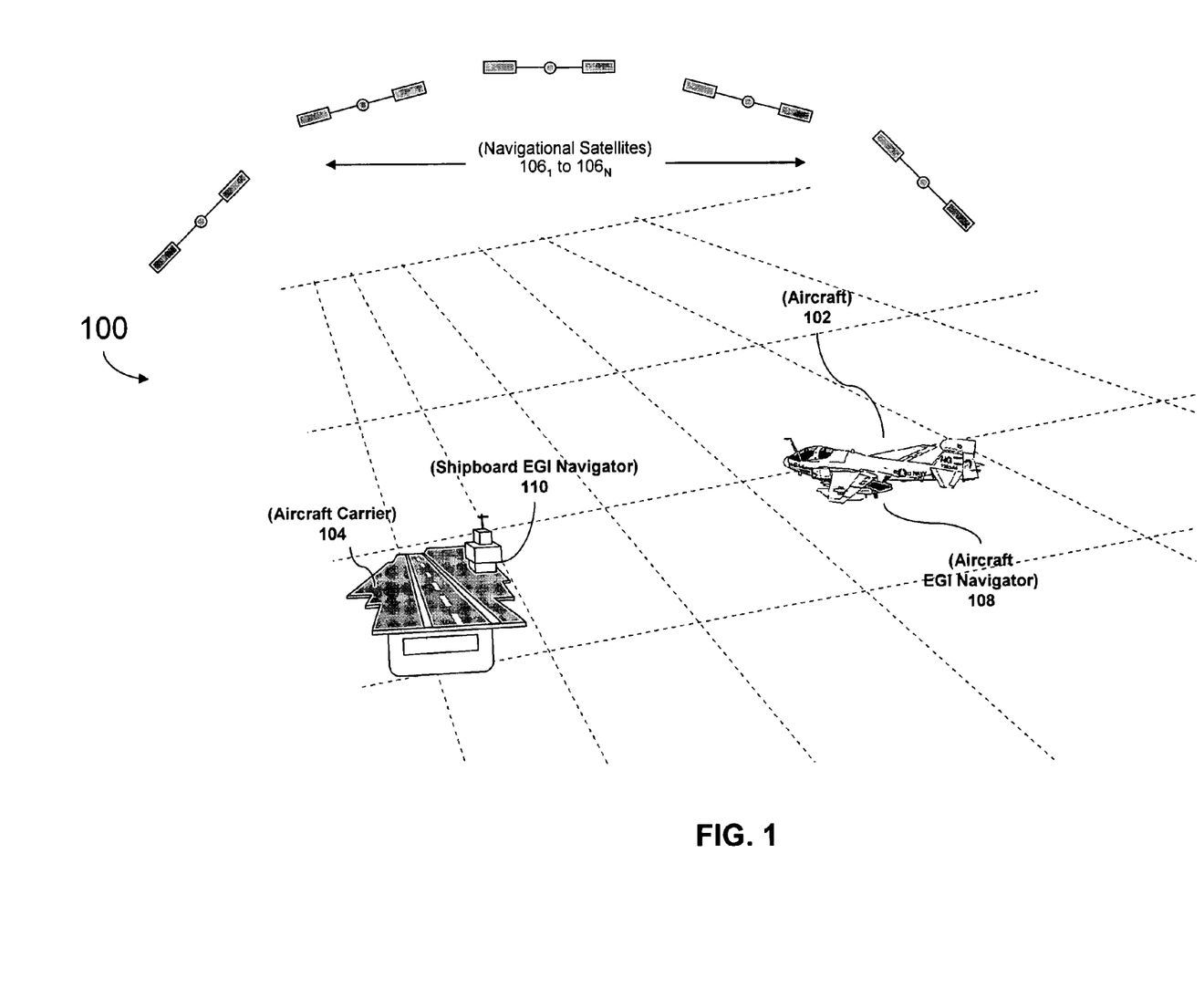
FIG. 1 is an illustration of relative navigation for shipboard landings in accordance with the present invention.

Referring to the drawings, FIG. 1 is an illustration of relative navigation for shipboard landings, indicated generally at 100, with a method used in autonomous shipboard landings by aircraft onto seaborne aircraft carriers according to one embodiment of the present invention. Illustration 100 comprises aircraft 102 (e.g. a military aircraft 102), aircraft carrier 104 and navigational satellites $106_1$ through $106_N$. Aircraft 102 includes an aircraft embedded GPS/INS (EGI) navigator 108. In one embodiment, aircraft EGI navigator 108 is a modified version of the HONEYWELL® H-764 advanced configurable EGI (ACE) navigator, a navigational guidance system, or the like used on aircraft, transports, and military helicopters. Aircraft carrier 104 includes a shipboard EGI navigator 110. In one embodiment, shipboard EGI navigator 110 is a standard version of the HONEYWELL H-764 advanced configurable EGI (ACE) navigator, a navigational guidance system, or the like used on aircraft, transports, and military helicopters.

In operation, as aircraft 102 enters an area where it has access to the inertial and GPS measurement data of aircraft carrier 104, position and velocity measurements of aircraft 102 are recorded by aircraft EGI navigator 108 using ranging data sent by at least one navigational satellite $106_1$ through $106_N$. Aircraft EGI navigator 108 receives shipboard sensor data from shipboard EGI navigator 110. Aircraft EGI navigator 108 processes the airborne and shipboard measurement data to determine a relative velocity and position between aircraft 102 and aircraft carrier 104. By determining a relative velocity and relative position, successful autonomous landings can be achieved even during momentary absence of satellite navigational signals.

Figure 2:
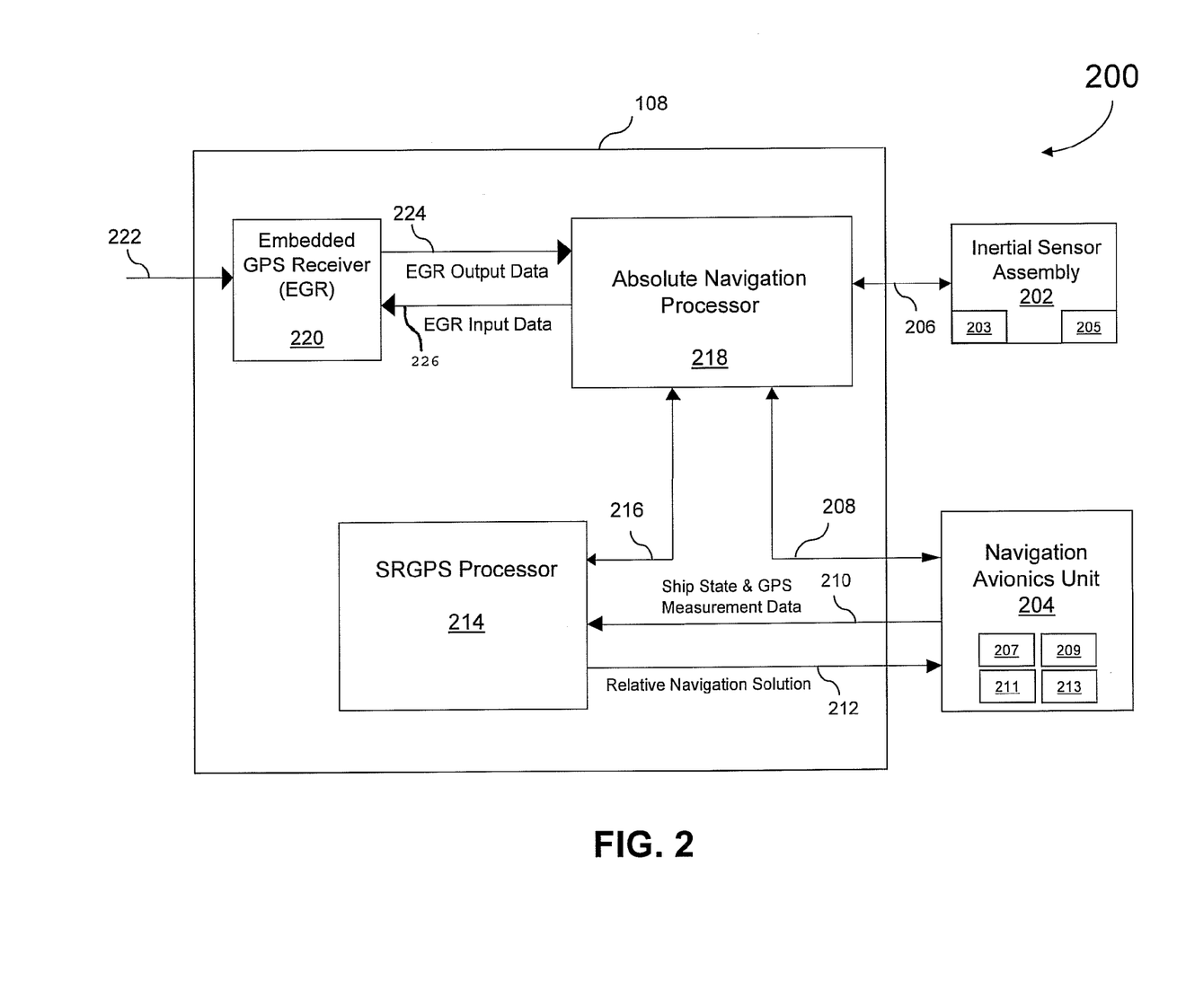
FIG. 2 is a block diagram of one embodiment of a navigation avionics system used in relative navigation for shipboard landings in accordance with the present invention.

FIG. 2 is a block diagram of one embodiment of a navigation avionics system used in relative navigation for shipboard landings, indicated generally at 200, according to one embodiment of the present invention. System 200 comprises aircraft EGI navigator 108 of FIG. 1, communicatively coupled to inertial sensor assembly 202 and navigation avionics unit 204. In one embodiment, inertial sensor assembly 202 contains at least three gyroscopes 203 and at least three accelerometers 205 positioned in an orthogonal arrangement. In one embodiment, navigation avionics unit 204 is part of a navigation system for an aircraft that includes multifunction control 207, display units 209, data processing systems 211, adaptive antenna systems 213, and the like. Aircraft EGI navigator 108 includes an embedded GPS receiver (EGR) 220 that is communicatively coupled to an absolute navigation processor 218. The aircraft EGI navigator also includes a shipboard relative GPS (SRGPS) processor 214. In one embodiment, EGR 220 is a single selective availability anti-spoofing module (SAASM)-based 24-channel embedded GPS receiver with a radio frequency (RF) antenna interface. Moreover, in one embodiment, the absolute navigation processor 218 contains Modified-Off-The-Shelf (MOTS) software that provides standard processing functionality including formation of the absolute navigation solution, as further described in reference to FIG. 3 below. The SRGPS processor 214 contains the processing functions necessary for determining the relative navigation solution as further described in reference to FIG. 3 below.

Inertial sensor assembly 202 is communicatively coupled to absolute navigation processor 218 by sensor measurement transfer medium 206. In one embodiment, sensor measurement transfer medium 206 uses the EIA standard RS-422 protocol, or the like. Navigation avionics unit 204 is communicatively coupled to absolute navigation processor 218 by navigation interface transfer medium 208. In one embodiment, navigation interface transfer medium 208 uses the interface standard MIL-STD-1553 Bus, or the like. Navigation avionics unit 204 is also communicatively coupled to SRGPS processor 214 by SRGPS input data transfer medium 210 and SRGPS output data transfer medium 212. In one embodiment, both SRGPS input data transfer medium 210 and SRGPS output data transfer medium 212 uses the interface standard MIL-STD-1553 Bus, or the like. Absolute navigation processor 218 and SRGPS processor 214 are communicatively coupled by application communication transfer medium 216. In one embodiment, application communication transfer medium 216 uses a 1 mega-bit (MB) synchronous data link control (SDLC) RS-422 serial interface, or the like. Absolute navigation processor 218 is also communicatively coupled to EGR 220 by EGR output data transfer medium 224 and EGR input data transfer medium 226. In one embodiment, both EGR output data transfer medium 224 and EGR input data transfer medium 226 use dual port random access memory (DPRAM), or the like. EGR 220 is also communicatively coupled to the plurality of navigational satellites $106_1$ through $106_N$ of FIG. 1 by navigational information transfer medium 222. In one embodiment, navigational information transfer medium 222 receives one of RF or digital navigational signals, or the like.

In operation, EGR 220 receives current GPS measurement data of aircraft 102 of FIG. 1 from navigational information transfer medium 222 and sends the GPS measurement data via EGR output data transfer medium 224 to absolute navigation processor 218. Concurrently, inertial sensor assembly 202 provides current inertial measurement data of aircraft 102 via sensor measurement transfer medium 206 to absolute navigation processor 218. Absolute navigation processor 218 estimates the absolute position and velocity with respect to GPS navigational coordinates of aircraft 102. Moreover, the absolute navigation processor 218 provides aircraft INS sensor data and GPS aircraft data (PR and carrier phase) to the SRGPS processor 214 via transfer medium 216. The navigation avionics unit 204 provides ship GPS measurements (PR and carrier phase) and ship state data to SRGPS processor 214 via transfer medium 210. The SRGPS uses the data for construction of the relative navigation solution which is provided to the navigation avionics unit 204 via transfer medium 212. The relative navigation solution is used by the navigation avionics unit 204 to update the navigational instrumentation of aircraft 102 via navigation interface transfer medium 208. In one embodiment, navigation avionics unit 204 receives GPS/INS position and velocity broadcasts from aircraft carrier 104 of FIG. 1 and sends the GPS/INS position and velocity broadcasts from aircraft carrier 104 to SRGPS processor 214 via SRGPS input data transfer medium 210. SRGPS processor 214 determines a relative position and velocity between aircraft carrier 104 and aircraft 102 as a relative navigation solution and provides the relative navigation solution to navigation avionics unit 204 via SRGPS output data transfer medium 212. The relative navigation solution provided by SRGPS processor 214 is propagated forward in time to account for a potential loss in measurement data from GPS navigational satellites during autonomous shipboard landings by aircraft onto seaborne aircraft carriers.

Figure 3:
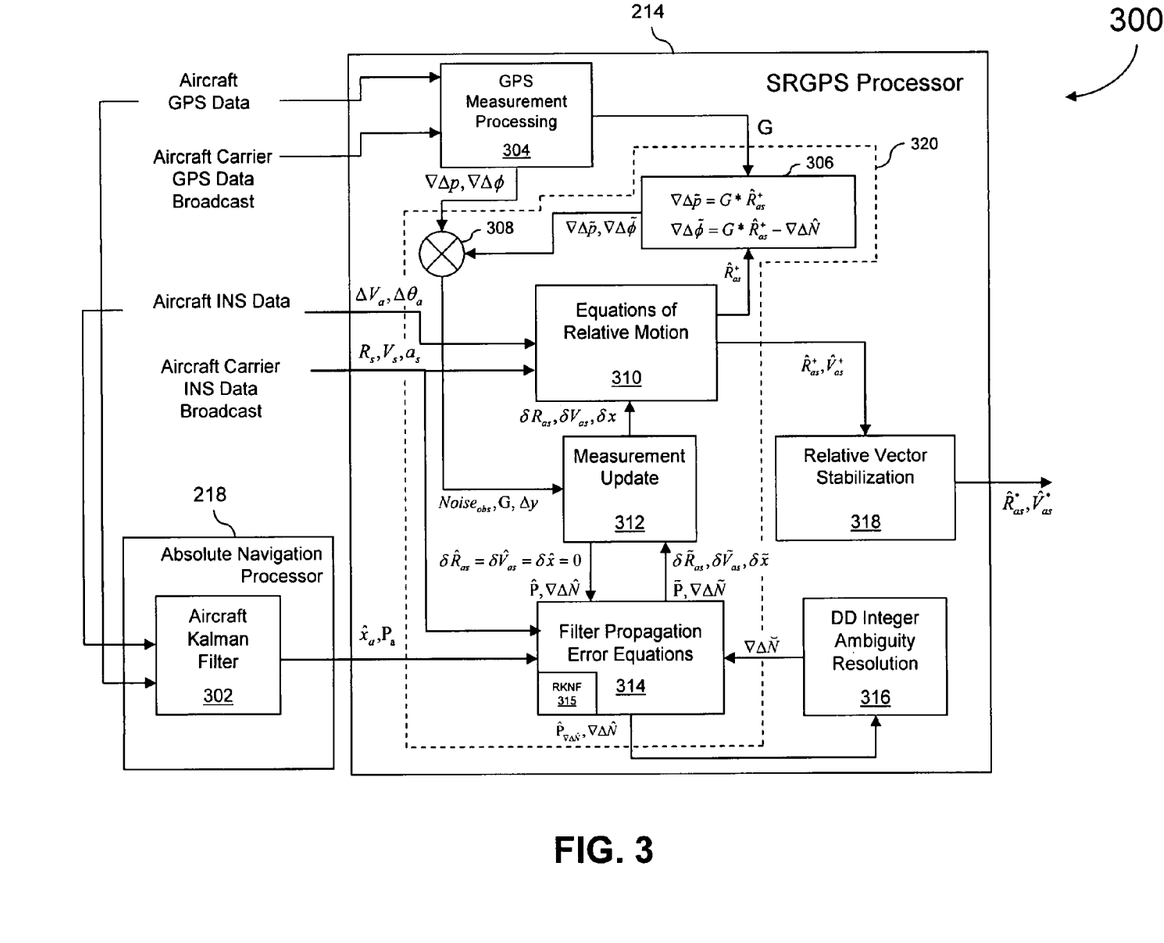
FIG. 3 is a block diagram illustrating one embodiment of a method of relative navigation for shipboard landings in accordance with the present invention.

FIG. 3 is a block diagram illustrating one embodiment of a method of relative navigation for shipboard landings, indicated generally at 300, according to one embodiment of the present invention. FIG. 3 illustrates a relative navigation solution 300 provided by a SRGPS processor 214 of FIG. 2 and an absolute navigation processor 218 of FIG. 2. Within the SRGPS processor 214, a relative navigation algorithm block 320 is in communication with a GPS measurement processing block 304, a double difference (DD) integer ambiguity resolution block 316, and a relative vector stabilization block 318. The relative navigation algorithm block 320 is also adapted to receive communication from an aircraft Kalman filter block 302 of the absolute navigation processor 218.

In one embodiment, the absolute navigation processor 218 processes aircraft GPS data and aircraft INS data in the aircraft Kalman filter block 302. In one embodiment, the aircraft Kalman filter block 302 is a standard implementation of a Kalman filter within aircraft EGI navigator 108 of FIG. 1, which provides a computational algorithm that processes measurements from an aircraft GPS/INS navigator to deduce an estimate of the past, present, or future state of the aircraft's position and velocity. The results generated by the aircraft Kalman filter block 302 are used in the relative navigation algorithm computed in the relative navigation algorithm block 320. In particular, the results are used in a Relative Navigation Kalman Filter (RKNF) 315 of a filter propagation error equations block 314, which is described in further detail below.

In one embodiment, relative vector stabilization block 318 stabilizes the relative position and velocity vectors provided by relative navigation algorithm block 320 between the ship touchdown (TD) point and the aircraft guidance and control point (GCP). Due to the complicated motions of both aircraft carrier 104 and aircraft 102 of FIG. 1, the relative position vector and relative velocity vector between any aircraft carrier point and any aircraft point will be less stable than what is useful to a pilot (or auto-pilot) of aircraft 102. The objective of relative vector stabilization (RVS) is to remove as much motion from aircraft carrier 104 as possible from the relative vector, leaving only some overall gross motion of aircraft carrier 104, e.g., translation through space and large yawing maneuvers. The motions that are taken out of aircraft carrier 104 are the high frequency translational motions, e.g., heaving, swaying, and surging, the high frequency yawing motion, and the entire pitching and rolling motion. The low frequency yawing motion of aircraft carrier 104 remains in the relative vector solution to allow the ship to turn while aircraft 102 approaches. The relative vectors are stabilized only for the motion of aircraft carrier 104 and not the motion of aircraft 102.

In one embodiment, DD integer ambiguity resolution block 316 resolves DD integer ambiguities with navigation avionics system 200 of FIG. 2. In one embodiment, the process of resolving DD integer ambiguities involves determining a real-value estimate of the integers and position coordinates or ranges (called a "float" estimate), performing a search over integer space, to identify candidate solutions, tracking candidate solutions over time to identify the best solution (called the "fixed" integer ambiguities), and adjustment of the position coordinates or ranges using the knowledge of the integer ambiguity values, resulting in a "fixed" position or range solution. In one embodiment, the DD integer ambiguities are communicated to relative navigation algorithm block 320 for use in creating a relative navigation solution between aircraft 102 and aircraft carrier 104. In one embodiment, the relative navigation solution takes into account any motion between aircraft 102 and at least one navigation satellite $106_1$ through $106_N$ of FIG. 1 to eliminate candidate solutions and "lock" on the true set of integers. If aircraft 102 is also maneuvering, the time to resolve the DD integer ambiguities can be decreased considerably.

In one embodiment, filter propagation error equations block 314 is used in the process of resolving DD integer ambiguities in conjunction with DD integer ambiguity resolution block 316. In one embodiment, filter propagation error equations block 314 utilizes GPS double differenced carrier phase measurements as observables in the RNKF 315, where the RNKF 315 receives absolute solution error state and covariance data from aircraft Kalman filter 302. In one embodiment, the RNKF 315 makes use of a ship motion sensor (SMS) provided by aircraft carrier 104 and uses coordinates referenced in Earth Centered Earth Fixed (ECEF) coordinate frames. The ECEF coordinate system has its origin at the Earth's center and rotates with the Earth. The Earth's equator defines the x-y plane, the x-axis is through the Greenwich meridian, and the z-axis is through the North Pole. The y-axis completes the right-handed system ($Y=Z \times X$).

In one embodiment, there are two major modes of operation of the RNKF 315, float mode and fixed mode, along with sub-modes of the major modes. In the float mode, the RNKF 315 runs when less than 3 DD integer ambiguities (wide lane or single frequency) have been resolved, or GPS carrier measurements have been lost after integer lock, or a cycle slip has been detected. In one embodiment, errors in the estimate of the DD integer ambiguities are included as states in the RNKF 315 float mode. The measurements driving the RNKF 315 in the float mode will determine the sub-modes. In one embodiment, the sub-modes and the measurements in each sub-mode for the float mode of the RKNF 315 include code differential, or DD narrow lane (NL) code (when no carrier measurements are available), DD NL code and DD wide lane (WL) carrier (carrier differential float). In one embodiment, if GPS carrier measurements are lost but GPS code measurements remain, the RNKF 315 in the float mode runs in the code differential sub-mode; if both code and carrier DDs are lost, the RNKF 315 equations of motion are integrated, but no measurement updates are performed. In one embodiment, the RNKF 315 is initialized and operating in the float mode as soon as one full ship state message from aircraft carrier 104 has been received.

In one embodiment, the fixed operational mode of the RNKF 315 starts operating with the DD WL integers subtracted from the DD WL carrier measurements as observations. In one embodiment, the errors in the DD integers are no longer estimated as states in the RNKF 315, only carrier DDs are used for measurements. In one embodiment, if carrier lock is lost, or a cycle slip is detected, the RNKF 315 in the fixed mode continues to integrate its respective equations of motion using the aircraft and ship inertial measurements. In one embodiment, the RKNF 315 is operating in the float mode to estimate and fix integers again before resuming operation in the fixed mode with measurement updates. In one embodiment, the sub-modes with the RKNF 315 operating in the fixed mode are: wide lane DD integers fixed (but L1 and L2 integers not fixed), where DD WL carrier minus wide lane integers are used as observations; L1 DD integers fixed (but not L2), where DD L1 carrier minus DD L1 integers are used as observations; L2 DD integers fixed (but not L1), where DD L2 carrier minus DD L2 integers are used as observations; and both L1 and L2 DD integers fixed, where both DD L1 carrier minus DD L1 integers and DD L2 carrier minus DD L2 integers are used as observations. In one embodiment, there is complete error state feedback in the RNKF. In one embodiment, while the fixed RNKF is operating, the float RNKF is also operating and is used as a check on the fixed solution if the wrong set of integers were selected. In one embodiment, when both the float and fixed RNKFs are operating, the feedback correction vector is provided by the fixed RNKF.

The operating modes of RNKF 315 in one embodiment are listed below in order of increasing relative navigation performance:

Mode 0. (None): No relative navigation solution can be computed. Relative navigation begins in this state.

Mode 1. (Difference of Absolute Positioning Solutions): The relative navigation solution is computed by differencing absolute positions of the ship and aircraft.

Mode 2. (Code differential): The relative navigation solution is computed in a Kalman filter with double differenced single frequency or narrow lane pseudo-range (code) measurements.

Mode 3. (Float): The relative navigation solution is computed in a Kalman filter with double differenced single frequency or narrow lane code and double differenced single frequency or wide lane carrier measurements.

Mode 4. (Fixed): The DD integer ambiguities (wide lane or L1 and/or L2) have been determined and a solution is maintained with double differenced carrier measurements (wide lane or single frequency).

In one embodiment, transitions between modes 1-4 listed above are determined by:

1. Condition of data link specified by the code A, B, C, or D in Table 1 below.
2. Fixing (or loss of fix) of double differenced integer ambiguities.
3. Violation of a major position error tolerance (TOL).

Concerning the data link between aircraft carrier 104 and aircraft 102, one of the four conditions described in Table 1 always exists (a ✓ indicates the item is present, a ✗ indicates the item is not present):

TABLE 1

| Description of data link | Ship state | Ship code | Ship carrier |
|---|---|---|---|
| A No data link | x | x | x |
| B Ship state only | ✓ | x | x |
| C Ship state + ship code | ✓ | ✓ | x |
| D Ship state + ship code + ship carrier | ✓ | ✓ | ✓ | where ship code represents GPS pseudo-range measurements for aircraft carrier 104, and ship carrier represents GPS carrier phase measurements for aircraft carrier 104.

In one embodiment, the navigation modes 0-4 are evaluated under each of the conditions A-D in Table 1 above. The transition between modes determined by the fixing (or loss of fix) affects Modes 3 and 4. The violation of the position error tolerance affects the transitions between Modes 2/3 and 1/0. To transition from Mode 0 to Mode 3, ship state information and ship GPS code and carrier must be available. While all three of these items are available (data link condition D), the RKNF 315 continues to operate in Mode 3. If the RNKF operating in Mode 3 fixes the DD integer ambiguities, operation of the RNKF 315 transitions to Mode 4. If ship GPS carrier is lost (data link condition C), operation of the RNKF 315 transitions to Mode 2. If all ship GPS measurements are lost (data link condition B) operation of RNKF 315 remains in Mode 3. In Mode 3, the RNKF 315 measurement updates can no longer be performed, but the covariance matrix is propagated forward. If this condition persists, operation of RNKF 315 remains in Mode 3 until the relative position uncertainty becomes so large that remaining in Mode 3 is no better than differencing absolute positions, at which point operation of RNKF 315 transitions to Mode 1.

In one embodiment, when a complete data link dropout occurs (data link condition A) without ship state information, the ship state is propagated forward based on the last known state. The ability to propagate the ship state forward allows the aircraft 102 to complete an autonomous shipboard landing without detection from an 'unfriendly', i.e. unwanted detection of either aircraft 102 or aircraft carrier 104 by jamming the signals provided by navigational satellites $106_1$ through $106_N$. In this condition, the RNKF 315 does not perform measurement updates, and the RNKF 315 covariance matrix terms are allowed to grow indefinitely. When the position uncertainty becomes too great and the aircraft carrier 104 position is still not available, operation of the RKNF 315 transitions to Mode 0 and reports that no relative navigation solution is possible.

In one embodiment, the float Kalman filter states is decomposed into fixed states and integer states as shown in Equation 1:

$$x_{float} = \begin{bmatrix} x_{fixed} \\ x_N \end{bmatrix} \quad \text{Equation 1}$$

and is further decomposed as shown in Equation 2:

$$x_{float} = \begin{bmatrix} \delta \Delta R^E \\ \delta \Delta V^E \\ \delta \Delta A^E \\ \delta \Delta \nabla N_{WL} \end{bmatrix} \quad \text{Equation 2}$$

In one embodiment, the states of the float RNKF are as shown in Table 2 below:

TABLE 2

| Symbol | Number of elements | Description | Units |
|---|---|---|---|
| $\delta \Delta R^E$ | 3 | Error in baseline vector from ship SMS to aircraft EGI (relative position coordinatized in ECEF) | feet |
| $\delta \Delta V^E$ | 3 | Error in rate of change of baseline vector as seen from ECEF and coordinatized in ECEF; relative velocity vector | feet/sec |
| $\delta \Delta A^E$ | 3 | Relative acceleration errors (rate of change of relative velocity vector as seen from ECEF and coordinatized in ECEF) | feet/sec² |
| $\delta \Delta \nabla N_{WL}$ | $N_{sv} - 1$ | Error in DD WL integer ambiguities | wide lane cycles |

In Table 2 above, $N_{sv}$ is the number of visible GPS satellites above elevation mask with valid measurements.

In one embodiment, multiple relative navigation filters are maintained depending on the present GPS/INS measurements and the operations being conducted. In one embodiment, there are three solutions possible once the aircraft 102 enters the landing system service volume and has access to the aircraft carrier 104 GPS/INS measurement data. In one embodiment, the solution types, their states and the required measurement data for each are shown in Table 3:

TABLE 3

| RNKF Type | States | Number of States | Measurements | Number of Measurements |
|---|---|---|---|---|
| Float (Code Differential) | $x_{float}$ | $9 + (N_{sv} - 1)$ | $\Delta \nabla p_{NL}$ | $N_{sv} - 1$ |
| Float (Carrier Differential) | $x_{float}$ | $9 + (N_{sv} - 1)$ | $\Delta \nabla p_{NL}$ and $\Delta \nabla \phi_{WL}$ | $2(N_{sv} - 1)$ |
| Fixed (WL) | $x_{fixed}$ | 9 | $\Delta \nabla \phi_{WL}$ | $N_{sv} - 1$ |
| Fixed (L1) | $x_{fixed}$ | 9 | $\Delta \nabla \phi_{L1}$ | $N_{sv} - 1$ |
| Fixed (L2) | $x_{fixed}$ | 9 | $\Delta \nabla \phi_{L2}$ | $N_{sv} - 1$ |
| Fixed (L1 & L2) | $x_{fixed}$ | 9 | $\Delta \nabla \phi_{L1}$ and $\Delta \nabla \phi_{L2}$ | $2(N_{sv} - 1)$ |

As shown in Table 3 above, the fixed solution refers to the solution resulting when the GPS double differenced carrier phase wavelength integer ambiguities are resolved, as mentioned in the description of DD integer ambiguity resolution block 316 above.

In one embodiment, GPS measurement processing block 304 is adapted to receive the aircraft GPS position measurement and a broadcast of an aircraft carrier GPS position measurement. In one embodiment, GPS code and carrier double differences, $\Delta \nabla p$ and $\Delta \nabla \phi$, are formed each epoch for at least two navigation satellites $106_1$ through $106_N$ that aircraft 102 and aircraft carrier 104 are mutually tracking. In one embodiment, both sets of GPS data, i.e. the GPS data of aircraft 102 and aircraft carrier 104, are initially uncorrected for atmospheric effects, allowing common tropospheric and ionospheric correction techniques to be applied. In one embodiment, the use of the uncorrected sets of GPS data allows common mode atmospheric errors to be eliminated during the double differencing process in DD integer ambiguity resolution block 316 described above. In one embodiment, no single navigation satellite $106_1$ through $106_N$ is used as the reference, avoiding potential problems should the reference be dropped from the measurement set.

In one embodiment, the DD code measurements from DD integer ambiguity resolution block 316 represent the projections of a baseline relative position vector calculated by relative navigation algorithm block 320. In one embodiment, geometric relationships of at least two of navigation satellites $106_1$ through $106_N$ are considered prior to pairing for maximizing baseline observability as shown in GPS predicted measurement block 306, where the value of G represents the geometry matrix of least two of navigation satellites $106_1$ through $106_N$ and the baseline (relative position vector). By avoiding the pairing of navigation satellites $106_1$ through $106_N$ that occupy similar elevations and portions of the sky, the maximum projection of the baseline vector onto the rows of G can be achieved.

In one embodiment, the uncorrected GPS code and carrier double differences from GPS measurement processing block 304 are combined with the predicted GPS code and carrier double differences from predicted GPS measurement processing block at summation point 308. The combined GPS code and carrier differences are transferred to measurement update block 312 to form the code and carrier GPS measurement predictions. Measurement update block 312, in conjunction with equations of relative motion block 310 and filter propagation error equations block 314, provide the relative velocity and position vectors to relative vector stabilization block 318. This sequence of operations provides a relative navigation solution between the ship touchdown (TD) point and the aircraft guidance and control point (GCP).

In one embodiment, the information provided to equations of relative motion block 310 includes acceleration, velocity, and position of aircraft carrier 104. In one embodiment, this information is available at 20 Hz. Further in one embodiment, the acceleration data of aircraft carrier 104 is provided to equations of relative motion block 310 in the ship north, east, down (NED) frame. In one embodiment, aircraft 102 delta velocity and delta rotation angles are provided to equations of relative motion block 310. In one embodiment, aircraft carrier 104 velocity is integrated in ECEF coordinates. Further in one embodiment, the integration of aircraft 102 position, velocity, and attitude and aircraft carrier 104 position, velocity, and attitude is performed as shown in Equations 3 to 7 below. In one embodiment, the acceleration provided is as seen from the NED frame of aircraft carrier 104, which requires the use of the second term in Equation 5:

$$\dot{R}_a^E = \hat{V}_a^E \quad \text{Equation 3}$$

$$\dot{R}_s^E = \hat{V}_s^E \quad \text{Equation 4}$$

$$\dot{V}_a^E = \hat{C}_{b_a}^E \tilde{f}_a^{b_a} + 2\{\hat{\omega}_{iE}^E\}\hat{V}_a^E + \hat{g}_p^E(\hat{R}_a^E) \quad \text{Equation 5}$$

$$\dot{V}_s^E = \hat{C}_{NED_s}^E \tilde{a}_s^{NED_s} - \hat{C}_{NED_s}^E \{\hat{\omega}_{E,NED_s}^{NED_s}\}\hat{C}_E^{NED_s}\hat{V}_s^E \quad \text{Equation 6}$$

$$\dot{\hat{C}}_{b_a}^E = \{\hat{\omega}_{iE}^E\}\hat{C}_{b_a}^E - \hat{C}_{b_a}^E\{\tilde{\omega}_{ib_a}^{b_a}\} \quad \text{Equation 7}$$

In Equations 3 to 7 above, R represents the position vector, V represents the velocity vector, $\omega_{AB}$ represents the angular rate vector of coordinate frame B with respect to coordinate frame A, g(R) represents the gravity vector at location R (where R is vector from Earth's center), and $C_A^B$ represents a direction cosine matrix (DCM) to transform a vector from coordinate frame A to coordinate frame B. Subscript a represents the aircraft, subscript b represents body frame, subscript i represents the inertial frame that travels with the Earth's center, but does not rotate with the Earth, i.e., appears non-rotating with respect to the stars, subscript s represents the aircraft carrier (ship), and superscript E represents the ECEF frame. In particular, $\omega_{iE}^E$ represents the angular rate of an ECEF frame with respect to an inertial frame, resolved in ECEF frame coordinates, the value of which is shown in Equation 8 as:

$$\omega_{iE}^E = \begin{bmatrix} 0 \\ 0 \\ 7.2921151467 \times 10^{-5} \end{bmatrix}_{ECEF} \text{rad}s/s \quad \text{Equation 8}$$

In one embodiment, where the cross product of a pair of 3-vectors is described as a×b=Ab, the following notation of Equation 9 will be used to describe a vector cross product:

$$a \times b = -\{a\}b \quad \text{Equation 9}$$

where $$\{a\} = \begin{bmatrix} 0 & a_3 & -a_2 \\ -a_3 & 0 & a_1 \\ a_2 & -a_1 & 0 \end{bmatrix}$$

and {a} represents the skew-symmetric 3×3 matrix formed from the vector a=[a$_1$ a$_2$ a$_3$]$^T$.

The expression A=diag(a) creates a 3×3 diagonal matrix A from a 3 vector a=[a$_1$ a$_2$ a$_3$]$^T$ according to Equation 10:

$$A = \begin{bmatrix} a_1 & 0 & 0 \\ 0 & a_2 & 0 \\ 0 & 0 & a_3 \end{bmatrix} \quad \text{Equation 10}$$

The expression A=sym(a) creates a 3×3 symmetric matrix A from a 3-vector a=[a$_1$ a$_2$ a$_3$]$^T$ according to Equation 11:

$$A = \begin{bmatrix} 0 & a_3 & a_2 \\ a_3 & 0 & a_1 \\ a_2 & a_1 & 0 \end{bmatrix} \quad \text{Equation 11}$$

A floating point number x is expressed as x=int[x]+frac[x], where frac[x] is the portion of the number after the decimal point, and int[x]=x−frac[x]. The vector quantity X is coordinatized (or resolved) in any coordinate frame. If there are two coordinate frames A and B, the representation of X in each of these frames is written as X$^A$ and X$^B$. In one embodiment, one representation is written in terms of the other with the use of the Direction Cosine transformation Matrix (DCM). The DCM that transforms a vector originally resolved in the A frame into a vector expressed in the B frame is $C_A^B$ and the two representations are related by the expressions in Equation 12:

$$X^B = C_A^B X^A \quad X^A = C_B^A X^B \quad C_A^B = (C_B^A)^T \quad \text{Equation 12}$$

The vector $R_{A,P}^B$ represents the position vector of a point P as seen from an observer fixed in frame A, and coordinatized in frame B. Moreover, if two frames A and B have a common origin $R_{A,P} = R_{B,P} = R_P$ (coordinatized in any frame), 2 subscripts will not be used for a position vector. When the "from an observer fixed in frame" subscript is omitted, the point P is viewed from the origin of the frame in which it is expressed (the superscript) as $R_{A,P}^A = R_P^A$. The vector $R_{A,PQ}^A = R_{PQ}^A = R_Q^A - R_P^A$ represents the relative position vector pointing from P to Q coordinatized in frame A. Further, $R_{PQ}^A$ or $R_{A,PQ}^A$ is used to express a position vector pointing from P to Q.

The vector $V_{B,P}^A$ represents the velocity vector of a point P, as seen from an observer fixed in the B frame, and resolved in the A frame. In one embodiment, the vector $V_{B,PQ}^A = V_{B,Q}^A - V_{B,P}^A$ represents the relative velocity vector of point P with respect to point Q, as seen by an observer fixed in the B frame, and resolved in the A frame. In one embodiment, a relative velocity vector is also represented by $V_{PQ}^A = V_{A,PQ}^A$.

Initialization and update of the equations of relative motion is performed by measurement update block 312. The measurement update block 312 provides the reference trajectories $\Delta \hat{R}^E$ and $\Delta \hat{V}^E$ and updates the code and carrier GPS measurement predictions used in equations of relative motion block 310. In one embodiment, the aircraft carrier 104 and aircraft 102 GPS measurements are synchronous with the top of the GPS epoch (the GPS second, or a rate of 1 Hz) for ease in synchronization of aircraft carrier 104 and aircraft 102 GPS measurements. In one embodiment, the aircraft carrier 104 GPS measurements are synchronous with respect to the 20 Hz ship state information of aircraft carrier 104, and the aircraft 102 GPS measurements are asynchronous with respect to the aircraft state measurements. In one embodiment, aircraft carrier 104 and aircraft 102 GPS code measurements are available at 2 Hz on both GPS L1 and L2 frequencies. In one embodiment, aircraft carrier 104 and aircraft 102 GPS carrier measurements are available at 2 Hz on both GPS L1 and L2 frequencies. In one embodiment, the Kalman filters that are implemented in filter propagation error equations block 314 include feedback, and the parameters that are input into the integration routines are corrected; this includes sensor errors as well as the dynamic state errors of position, velocity, and attitude. In one embodiment, the aircraft inertial measurement unit (IMU) measurements $\Delta V_a^{b_a}$ and $\Delta \theta_a^{b_a}$ that are input into the integration routines are compensated for coning, sculling, temperature, etc. before being used in the integration routines.

Initialization of the relative position and velocity reference trajectories $\Delta \hat{R}^E$, and $\Delta \hat{V}^E$ are initialized in measurement update block 312. In one embodiment, $\Delta \hat{R}^E$ is initialized by using double difference narrow lane pseudo-range processing, described in detail below, to generate a least squares solution to the problem as shown in Equations 13 and 14:

$$\Delta \nabla \tilde{p}_{NL} = H \Delta R_{GPS}^E = DDE \Delta R_{GPS}^E$$

$$\Delta \hat{R}_{GPS}^E(0) = (H^T H)^{-1} H^T \Delta \nabla \tilde{p}_{NL} \qquad \text{Equations 13 and 14}$$

where p represents the GPS pseudo-range or code measurement, H represents the Kalman filter measurement connection matrix, E represents the matrix of unit vectors, DD represents the GPS double difference matrix, and subscript NL represents narrow-lane DD integer ambiguities. In one embodiment, the baseline vector of Equation 7 points from the GPS antenna of aircraft carrier 104 to the GPS antenna of aircraft 102. In one embodiment, initialize the vector that points from the ship SMS of aircraft carrier 104 to the aircraft EGI of aircraft 102 must be initialized by correcting $\Delta \hat{R}_{GPS}^E(0)$ for the two lever arms as shown in Equation 15:

$$C_{b_s}^E r_{SMS2GPS,ship}^{b_s} + \Delta \hat{R}_{GPS}^E = \Delta$$
$$\hat{R}_{SMS2EGI}^E + C_{b_a}^E r_{EGI2GPS,aircraft}^{b_a} \Delta \hat{R}^E(0) = \Delta$$
$$\hat{R}_{SMS2EGI}^E(0) = \Delta$$
$$\hat{R}_{GPS}^E(0) - C_{b_a}^E r_{EGI2GPS,aircraft}^{b_a} + C_{b_s}^E r_{SMS2GPS,ship}^{b_s} \qquad \text{Equation 15}$$

where the direction cosine matrices (DCMs) $C_{b_a}^E$ and $C_{b_s}^E$ are constructed from position and attitude information for aircraft carrier 104 (ship) and aircraft 102, respectively. The construction of DCMs $C_{b_a}^E$ and $C_{b_s}^E$ is shown below.

The construction of DCM Aircraft Body Frame $b_a$ to Aircraft Local Frame $L_a$ is shown below. In one embodiment, aircraft body frame $b_a$ is fixed in aircraft 102 with an x-axis through the aircraft nose, y-axis through the right wing, and a z-axis through the bottom of the aircraft. In one embodiment, aircraft local frame $L_a$ is a locally level, wander azimuth frame, with z-axis pointing down; the angle between true North and the y axis of $N_a$ is the aircraft's wander angle. This is the local level frame implemented by the advanced configurable EGI, and some of the needed aircraft state information is in this frame. When the wander angle for the aircraft provided by the advanced configurable EGI is zero, this frame is an NED frame. The wander angle is defined in the positive sense by a clock-wise rotation about the Down axis, i.e. brings the North axis into the East axis. In one embodiment, this matrix depends on aircraft 102 pitch $\theta_a$, roll $\phi_a$, and platform heading (not true heading) $\psi_a$ as shown in Equation 16:

$$C_{b_a}^{L_a} = \begin{bmatrix} \cos\theta_a \cos\psi_a & \sin\phi_a \sin\theta_a \cos\psi_a - \cos\phi_a \sin\psi_a & \cos\phi_a \sin\theta_a \cos\psi_a + \sin\phi_a \sin\psi_a \\ \cos\theta_a \sin\psi_a & \sin\phi_a \sin\theta_a \sin\psi_a + \cos\phi_a \cos\psi_a & \cos\phi_a \sin\theta_a \sin\psi_a - \sin\phi_a \cos\psi_a \\ -\sin\theta_a & \sin\phi_a \cos\theta_a & \cos\phi_a \cos\theta_a \end{bmatrix} \qquad \text{Equation 16}$$

The matrix $C_{L_a}^{b_a}$ is the transpose of this matrix. In one embodiment, the wander angle in the advanced configurable EGI is defined positive by a clock-wise rotation from true North about the Down axis so platform heading and true heading are related as shown in Equation 17:

$$\psi_{true} = \psi_a + \alpha \qquad \text{Equation 17}$$

where $\alpha$ is the wander angle from the ACE.

The construction of DCM Aircraft Local Navigation Frame $L_a$ to ECEF Frame E is shown below. In one embodiment, this matrix depends on aircraft latitude $l_a$, aircraft longitude $L_a$, and the wander angle $\alpha_a$ as shown in Equation 18:

$$C_{L_a}^E = \begin{bmatrix} -\sin l_a \sin\alpha_a - \cos L_a \sin l_a \cos\alpha_a & -\sin L_a \cos\alpha_a + \cos L_a \sin l_a \sin\alpha_a & -\cos L_a \cos l_a \\ \cos L_a \sin\alpha_a - \sin L_a \sin l_a \cos\alpha_a & \cos L_a \cos\alpha_a + \sin L_a \sin l_a \sin\alpha_a & -\sin L_a \cos l_a \\ \cos l_a \cos\alpha_a & -\cos l_a \sin\alpha_a & -\sin l_a \end{bmatrix} \qquad \text{Equation 18}$$

In one embodiment, the matrix $C_E^{L_a}$ is the transpose of this matrix.

The construction of DCM Aircraft Body Frame $b_a$ to ECEF Frame E is shown below. In one embodiment, this matrix is constructed from the previous two DCMs as shown in Equation 19:

$$C_{b_a}^E = C_{L_a}^E C_{b_a}^{L_a} \qquad \text{Equation 19}$$

This matrix is used in Equation 10 above. In one embodiment, the matrix $C_E^{b_a}$ is the transpose of this matrix.

The construction of DCM Ship Body Frame $b_s$ to Ship NED Frame $NED_s$ is shown below. In one embodiment, the ship body frame $b_s$ is fixed in aircraft carrier 104 with x-axis through the bow, y-axis through the starboard side, and the z-axis through the bottom of the aircraft carrier. It is also referred to as the ship keel frame. In one embodiment, this transformation is a function of ship pitch $\theta_s$, roll $\phi_s$, and true heading $\psi_{s,true}$ as shown in Equation 20:

$$C_{b_s}^{NED_s} = \begin{bmatrix} \cos\theta_s\cos\psi_{s,true} & \sin\phi_s\sin\theta_s\cos\psi_{s,true} - \cos\phi_s\sin\psi_{s,true} & \cos\phi_s\sin\theta_s\cos\psi_{s,true} + \sin\phi_s\sin\psi_{s,true} \\ \cos\theta_s\sin\psi_{s,true} & \sin\phi_s\sin\theta_s\sin\psi_{s,true} + \cos\phi_s\cos\psi_{s,true} & \cos\phi_s\sin\theta_s\sin\psi_{s,true} - \sin\phi_s\cos\psi_{s,true} \\ -\sin\theta_s & \sin\phi_s\cos\theta_s & \cos\phi_s\cos\theta_s \end{bmatrix}$$

Equation 20

In one embodiment, the matrix $C_{NED_s}^{b_s}$ is the transpose of this matrix.

The construction of DCM Ship NED Frame $NED_s$ to ECEF Frame E is shown below. In one embodiment, this is a function of ship latitude $l_s$ and ship longitude $L_s$ as shown in Equation 21:

$$C_{NED_s}^E = \begin{bmatrix} -\sin l_s \cos L_s & -\sin L_s & -\cos l_s \cos L_s \\ -\sin l_s \sin L_s & \cos L_s & -\cos l_s \sin L_s \\ \cos l_s & 0 & -\sin l_s \end{bmatrix}$$

Equation 21

In one embodiment, the matrix $C_E^{NED_s}$ is the transpose of this matrix.

The construction of DCM Ship Body Frame $b_s$ to ECEF Frame E is shown below. In one embodiment, this DCM can be constructed from the previous two DCMs as shown in Equation 22:

$$C_{b_s}^E = C_{NED_s}^E C_{b_s}^{NED_s}$$

Equation 22

This matrix is used in Equation 19 above.

Initialization of the relative position reference trajectory $\Delta \hat{R}^E$ continues with receiving position and attitude data for aircraft 102 from absolute navigation processor 218. In one embodiment, the position and attitude data for aircraft carrier 104 is broadcast to absolute navigation processor 218 and is constructed by the transformation matrices discussed above.

In one embodiment, relative velocity vector $\Delta \hat{V}^E$ is initialized by converting the ship velocity of aircraft carrier 104 from the NED frame to the ECEF frame and subtract from the aircraft velocity, already in ECEF and available from absolute navigation processor 218, as shown in Equation 23:

$$\Delta \hat{V}^E(0) = \hat{V}_a^E - C_{NED_s}^E \hat{V}_s^{NED_s}$$

Equation 23 where the matrix $C_{NED_s}^E$ is constructed from estimates of ship position as shown above.

In one embodiment, prior to updating the relative position and relative velocity, aircraft carrier 104 acceleration and aircraft 102 delta-V must be coordinatized in the ECEF frame. In one embodiment, aircraft carrier 104 linear acceleration $\tilde{a}_s^{NED_s}$ is provided by the 20 Hz data broadcast link. Linear acceleration $\tilde{a}_s^{NED_s}$ is the time rate of change of Earth relative velocity as seen by aircraft 102 in the NED frame, and coordinatized in the NED frame. In one embodiment, linear acceleration $\tilde{a}_s^{NED_s}$ is converted to the ECEF frame as shown in Equation 24:

$$\tilde{a}_s^E = C_{NED_s}^E (\tilde{a}_s^{NED_s} - \{\omega_{E,NED_s}^{NED_s}\} V_s^{NED_s})$$

Equation 24

In Equation 24, the Coriolis term has been used. In one embodiment, the Coriolis term is a standard application of the Coriolis Law, or effect of inertia. The term $\omega_{E,NED_s}^{NED_s}$ is the transport rate and is formed as shown in Equation 25:

$$\omega_{E,NED_s}^{NED_s} = M V_s^{NED_s}$$

Equation 25 where M is a matrix containing Earth curvature information and $V_s^{NED_s}$ is aircraft carrier 104 Earth relative velocity coordinatized in aircraft carrier 104 NED frame (available from the data link between aircraft 102 and aircraft carrier 104).

In one embodiment, aircraft 102 delta-V, or $dV^L$, is computed at a rate of 200 Hz on absolute navigation processor 218 and communicated to relative navigation algorithm block 320. In one embodiment, this change in velocity is coordinatized in ECEF, requiring one application of Coriolis and a coordinate transformation. In one embodiment, the continuous-time equation that relates Earth relative acceleration as seen from the local frame to Earth relative acceleration as seen from the ECEF frame is shown in Equation 26:

$$\dot{V}^L = \dot{C}_E^L V^E + C_E^L \dot{V}^E = \{\omega_{EL}^L\} C_E^L V^E + C_E^L$$
$$\dot{V}^E = \{\omega_{EL}^L\} V^L + C_E^L \dot{V}^E$$

Equation 26

This provides the expression for $\dot{V}^E$ as shown in Equation 27:

$$\dot{V}^E = C_L^E (\dot{V}^L - \{\omega_{EL}^L\} V^L)$$

Equation 27

In one embodiment, absolute navigation processor 218 calculates $dV^L$, the change in Earth relative velocity as seen from the local frame, over one IMU cycle. In one embodiment, this provides $dV^E$ as (adding the 'a' subscript for aircraft) shown in Equation 28:

$$dV_a^E = C_L^E (dV_a^L - \{\omega_{EL}^L\} V_a^L \Delta t_{rate1})$$

Equation 28

In one embodiment, at any aircraft 102 time $t_{a,i}$, $dV_a^E(t_{a,i})$ represents the change in velocity from the last 200 Hz time mark to $t_{a,i}$ (or from $t_{a,i-1}$ to $t_{a,i}$) as seen from ECEF and coordinatized in ECEF. In one embodiment, referring back to the previous figure, 11 delta-Vs are summed from $t_{a,1}$ to $t_{a,11}$. In one embodiment, to account for the overlap of these delta-V's with aircraft carrier 104 times, and to synchronize the sum with aircraft carrier 104 times, the sum is adjusted by subtracting a portion of $dV_a^E(t_{a,1})$ and $dV_a^E(t_{a,11})$. The aircraft delta-V representing the change in aircraft ECEF velocity from $t_{s,1}$ to $t_{s,2}$ is shown in Equation 29:

$$dV_a^E \Big|_{t_{s,1}}^{t_{s,2}} = dV_a^E(t_{s,2})$$

$$= \sum_{i=1}^{11} dV_a^E(t_{a,i}) - dV_a^E(t_{a,1}) \frac{[t_{s,1} - t_{a,0}]}{[t_{a,1} - t_{a,0}]} - dV_a^E(t_{a,11}) \frac{[t_{a,11} - t_{s,2}]}{[t_{a,11} - t_{a,10}]}$$

Equation 29 where all the times are as defined in Equation 28. The aircraft delta-V is approximated from $t_{s,1}$ to $t_{s,2}$ as shown in Equation 30:

$$dV_a^E \Big|_{t_{s,1}}^{t_{s,2}} \Box dV_a^E(t_{s,2}) \Box \sum_{i=1}^{11} dV_a^E(t_{a,1})$$

Equation 30 or

-continued $$\Box \sum_{i=2}^{11} dV_a^E(t_{a,i})$$

Once the aircraft carrier 104 acceleration and the aircraft 102 ΔV are coordinatized in the ECEF frame, the relative position and velocity measurements provided to equations of relative motion block 310 can be updated in measurement update block 312. The update of relative velocity uses previous relative velocity, aircraft carrier 104 acceleration at $t_{s,1}$ and $t_{s,2}$ and the summed aircraft 102 delta-V in the ECEF frame over that interval as shown in Equation 31:

$$\Delta \hat{V}^E(t_{s,2}) = \Delta \hat{V}^E(t_{s,1}) + dV_a^E(t_{s,2}) - \left[\frac{\tilde{a}_s^E(t_{s,1}) + \tilde{a}_s^E(t_{s,2})}{2}\right][t_{s,2} - t_{s,1}]$$

Equation 31

Trapezoidal integration of the ship acceleration is used as shown in Equation 31. This is valid for instantaneous aircraft carder 104 accelerations at $t_{s,1}$ and $t_{s,2}$. For average aircraft carrier 104 acceleration over the same interval, the relative velocity measurement should be updated as shown in Equation 32:

$$\Delta \hat{V}^E(t_{s,2}) = \Delta \hat{V}^E(t_{s,1}) + dV_a^E(t_{s,2}) - \tilde{a}_s^E(t_{s,1})[t_{s,2} - t_{s,1}]$$

Equation 32 where $\tilde{a}_s^E(t_{s,1})$ is the average acceleration over the interval $t_{s,1}$ to $t_{s,2}$. The relative position measurement provided to equations of relative motion block 310 is updated in measurement update block 312 using a trapezoidal integration routine as shown in Equation 33:

$$\Delta \hat{R}^E(t_{s,2}) = \Delta \hat{R}^E(t_{s,1}) + \left[\frac{\Delta \hat{V}^E(t_{s,1}) + \Delta \hat{V}^E(t_{s,2})}{2}\right][t_{s,2} - t_{s,1}]$$

Equation 33

The relative position and velocity vectors are constructed in equations of relative motion block 310 by interpolating aircraft 102 position and velocity to the nearest appropriate aircraft carrier 104 time. In one embodiment, aircraft times $t_{a,0}$ and $t_{a,1}$ are the times immediately before and after ship time $t_s$. Using linear interpolation, aircraft position and velocity at ship time $t_s$ are calculated as shown in Equations 34 and 35:

$$R_a^E(t_s) = R_a^E(t_{a,0}) + \frac{(t_s - t_{a,0})[R_a^E(t_{a,1}) - R_a^E(t_{a,0})]}{(t_{a,1} - t_{a,0})}$$

$$V_a^E(t_s) = V_a^E(t_{a,0}) + \frac{(t_s - t_{a,0})[V_a^E(t_{a,1}) - V_a^E(t_{a,0})]}{(t_{a,1} - t_{a,0})}$$

Equations 34 and 35

The relative position and velocity vectors at ship time $t_s$ are as shown in Equations 36 and 37:

$$\Delta R^E(t_s) = R_s^E(t_s) - R_a^E(t_s)$$

$$\Delta V^E(t_s) = V_s^E(t_s) - V_a^E(t_s)$$

Equations 36 and 37

In one embodiment, the position, track and horizontal velocity measurements of aircraft carrier 104 are provided once every 5 seconds, and the relative navigation solution is estimated for the 20 Hz update between ship state broadcasts. If GPS signals are lost at aircraft carrier 104 or aircraft 102, updating the reference trajectories $\Delta \hat{R}^E$ and $\Delta \hat{V}^E$, and constructing the code and carrier GPS measurement predictions will continue to be performed by relative navigation algorithm block 320 and provide a graceful degradation in the estimates of the relative position and velocity vectors.

Figure 4:
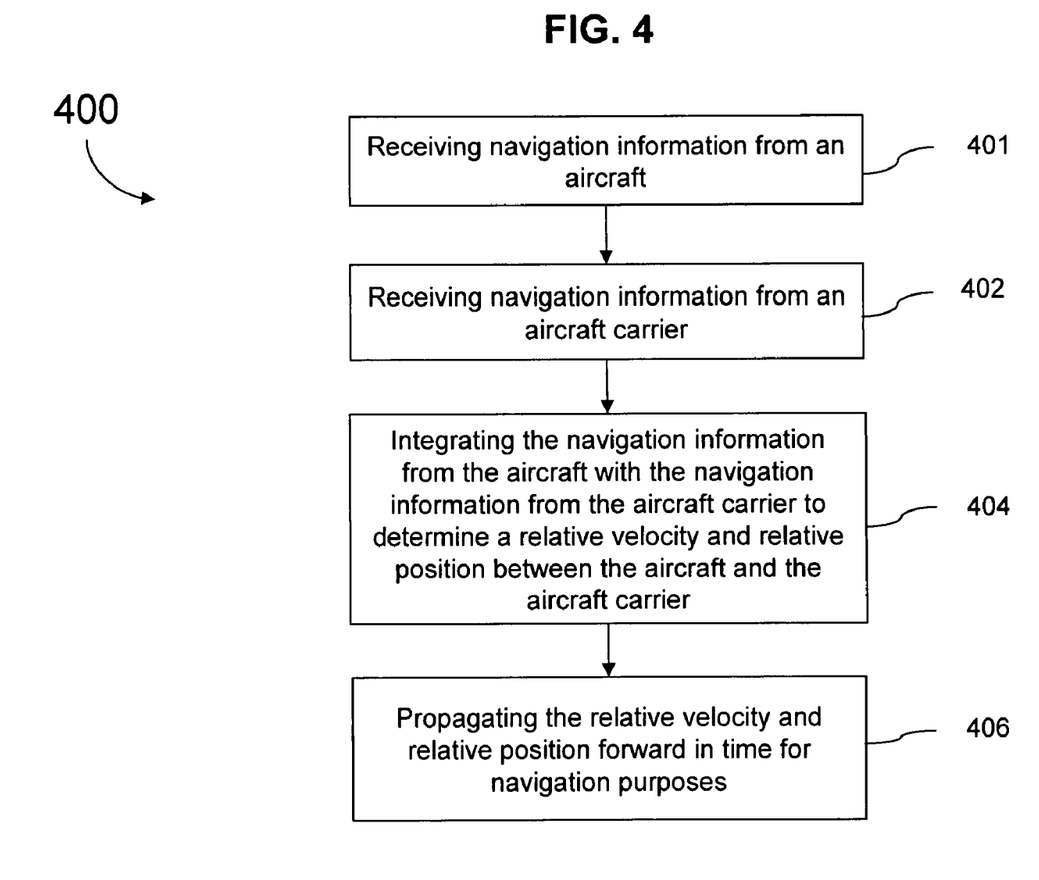
FIG. 4 is a flow diagram illustrating one embodiment of a method of relative navigation for shipboard landings in accordance with the present invention.

FIG. 4 is a flow diagram 400 illustrating an embodiment of a method according to the teachings of the present invention of relative navigation for autonomous shipboard landings. The method of FIG. 4 begins at block 401. Once an aircraft has access to an aircraft carrier's inertial and GPS measurement data, the process of determining a relative velocity and a relative position between the aircraft and the aircraft carrier begins. The method of FIG. 4 is designed to propagate the relative velocity and the relative position forward in time for navigation purposes.

At block 401, the method begins receiving navigation information from the aircraft, and the method proceeds to block 402. In one embodiment, the navigation information is GPS/INS measurement data from the aircraft's on-board navigation system. At block 402, the method begins receiving navigation information from the aircraft carrier, and the method proceeds to block 404. In one embodiment, the navigation information is a broadcast of GPS/INS measurement data from the aircraft carrier's on-board navigation system. At block 404, the navigation information gathered from the aircraft in block 400 and the navigation information gathered in block 402 is integrated to determine a relative velocity and relative position between the aircraft and the aircraft carrier. In one embodiment, velocity and position vectors are constructed for both the aircraft and aircraft carrier. The position vector of the aircraft is differenced with the position vector of the aircraft carrier to determine the relative position, and the velocity vector of the aircraft is differenced with the velocity vector of the aircraft carrier to determine the relative velocity. Once the relative velocity and relative position is determined, the method proceeds to block 406. At block 406, the relative velocity and relative position is propagated forward in time for navigation purposes.

In view of the foregoing, it will be understood by those skilled in the art that the methods of the present invention can be implemented in combination with present navigation avionics technology. Variations and modifications may occur, which fall within the scope of the present invention, as set forth in the following claims.

What is claimed is:

1. A method for providing relative navigation between two objects in motion, where a first object is approaching to land on a second object, the method comprising:
receiving navigation information from the first object;
receiving navigation information from the second object;
integrating the navigation information from the first object with the navigation information from the second object to determine a stabilized relative position and velocity vector between the first and second objects; and
based on a last known state of the second object, providing an estimate of the relative velocity vector and the relative position at a point forward in time for navigation purposes,
wherein integrating the navigation information comprises performing the following on a processor:
determining a combined GPS code based an uncorreted GPS code and carrier double differences combined with a predicted GPS code and carrier double differences and the received navigation information from the first and second objects;
calculating a baseline relative position vector based on the received navigation information from the first and second objects;
calculating a double difference code based on the baseline relative position vector;

calculating a relative position and velocity vector based on the double difference code, the combined GPS code and the received navigation information from the first and second objects; and stabilizing the relative position and velocity vector, wherein the estimates of the stabilized relative position and velocity vector are computed by differencing absolute positions of the ship and aircraft in a first operational mode, wherein the estimates of the stabilized relative position and velocity vector are computed using a relative navigation Kalman filter based on one of double differenced single frequency or narrow lane pseudo-range (code) measurements in a second operational mode, and wherein the estimates of the stabilized relative position and velocity vector are computed using the relative navigation Kalman filter based on double differenced single frequency or narrow lane code and double differenced single frequency or wide lane carrier measurements in a third operational mode.

2. The method of claim 1, wherein receiving navigation information from the first object comprises receiving GPS/INS measurement data from an on-board navigation system and wherein receiving navigation information from the second object comprises receiving a broadcast of GPS/INS measurement data from the second object.

3. The method of claim 1, wherein integrating the navigation information from the first object with the navigation information from the second object to determine a relative velocity and a relative position between the two first and second objects comprises:

constructing velocity and position vectors of the first object;

constructing velocity and position vectors of the second object;

differencing the velocity vector of the first object with the velocity vector of the second object; and differencing the position vector of the first object with the position vector of the second object.

4. The method of claim 1, wherein providing an estimate of the relative velocity and the relative position forward in time further comprises:

propagating relative velocity and relative position vectors forward in time at the same rate as signals are received from the second object; and aiding relative velocity and relative position vectors forward in time at the same rate as GPS signals are recorded by the first and second objects.

5. The method of claim 1, wherein transitions between modes 1-3 are determined based on condition of a data link between aircraft and carrier, fixed condition of DD integer ambiguities, and violation of a major position error tolerance (TOL), wherein the third mode is decomposed as follows:

$$x_{float} = \begin{bmatrix} x_{fixed} \\ x_n \end{bmatrix}$$

$X_n$ is integer state, $$x_{float} = \begin{bmatrix} \delta \Delta R^E \\ \delta \Delta V^E \\ \delta \Delta A^E \\ \delta \Delta \nabla N_{WL} \end{bmatrix}$$

$\delta \Delta R^E$ is error in baseline vector from ship motion sensor to aircraft embedded GPS/INS (EGI) (relative position coordinatized in ECEF), $\delta \Delta V^E$ is error in rate of change of baseline vector as seen from Earth Centered Earth Fixed (ECEF) and coordinatized in ECEF (relative velocity vector), $\delta \Delta A^E$ is relative acceleration errors (rate of change of relative velocity vector as seen from ECEF and coordinatized in ECEF), $\delta \Delta \nabla N_{WL}$ is error in DD Wide Lane (WL) integer ambiguities.

6. A method for guiding the approach and landing of an aircraft, the method comprising:

receiving navigation information from the aircraft;

receiving navigation information from an aircraft carrier;

integrating the navigation information from the aircraft with the navigation information from the aircraft carrier to determine a stabilized relative position and velocity vector between the aircraft and the aircraft carrier; and based on a last known state of the aircraft carrier, providing an estimate of the relative velocity vector and the relative position at a point forward in time to complete an autonomous shipboard landing, wherein integrating the navigation information comprises performing the following on a processor:

determining a combined GPS code based an uncorrected GPS code and carrier double differences combined with a predicted GPS code and carrier double differences and the received navigation information from the first and second objects;

calculating a baseline relative position vector based on the received navigation information from the first and second objects;

calculating a double difference code based on the baseline relative position vector;

calculating a relative position and velocity vector based on the double difference code, the combined GPS code and the received navigation information from the the aircraft and the aircraft carrier; and stabilizing the relative position and velocity vector, wherein the estimates of the stabilized relative position and velocity vector are computed by differencing absolute positions of the ship and aircraft in a first operational mode, wherein the estimates of the stabilized relative position and velocity vector are computed using a relative navigation Kalman filter based on one of double differenced single frequency or narrow lane pseudo-range (code) measurements in a second operational mode, and wherein the stabilized relative position and velocity vector are computed in the relative navigation Kalman filter based on double differenced single frequency or narrow lane code and double differenced single frequency or wide lane carrier measurements in a third operational mode.

7. The method of claim 6, wherein receiving navigation information from the aircraft comprises receiving GPS/INS measurement data from an on-board navigation system and wherein receiving navigation information from an aircraft carrier comprises receiving a broadcast of GPS/INS measurement data from the aircraft carrier.

8. The method of claim 6, wherein integrating the navigation information from the aircraft with the navigation information from the aircraft carrier to determine a relative velocity and a relative position between the aircraft and the aircraft carrier comprises:

constructing velocity and position vectors of the aircraft;

constructing velocity and position vectors of the aircraft carrier;

differencing the velocity vector of the aircraft with the velocity vector of the aircraft carrier; and differencing the position vector of the aircraft with the position vector of the aircraft carrier.

9. The method of claim 6, wherein providing an estimate of the relative velocity and the relative position forward in time further comprises:

propagating relative velocity and relative position vectors forward in time at the same rate as signals are received from the aircraft carrier; and aiding relative velocity and relative position vectors forward in time at the same rate as GPS signals are recorded by the aircraft and the aircraft carrier.

10. A computer-readable medium having computer-executable program instructions for a method for determining relative position and relative velocity between an aircraft and a seaborne aircraft carrier as the aircraft approaches the aircraft carrier, the method comprising:

integrating the attitude and position of the aircraft carrier with the attitude and position of the aircraft to produce a relative position;

integrating the velocity of the aircraft carrier with the velocity of the aircraft to produce a relative velocity; and constructing the reference trajectories for the relative position and velocity based on a prior data link between the aircraft and the aircraft carrier, wherein the integrating steps comprise performing the following on a processor:

determining a combined GPS code based an uncorreted GPS code and carrier double differences combined with a predicted GPS code and carrier double differences and the received navigation information from the aircraft and the aircraft carrier;

calculating a baseline relative position vector based on the received navigation information from the aircraft and the aircraft carrier;

calculating a double difference code based on the baseline relative position vector;

calculating a relative position and velocity vector based on the double difference code, the combined GPS code and the received navigation information from the aircraft and the aircraft carrier; and stabilizing the relative position and velocity vector, wherein the stabilized relative position and velocity vector are computed by differencing absolute positions of the carrier and aircraft in a first operational mode, wherein the stabilized relative position and velocity vector are computed using a relative navigation Kalman filter based on one of double differenced single frequency or narrow lane pseudo-range (code) measurements in a second operational mode, and wherein the stabilized relative position and velocity vector are computed using the relative navigation Kalman filter based on one of double differenced single frequency or narrow lane code and one of double differenced single frequency or wide lane carrier measurements in a third operational mode.

11. The computer-readable medium of claim 10, wherein integrating the attitude and position of the aircraft carrier with the attitude and position of the aircraft comprises using a trapezoidal integration scheme.

12. The computer-readable medium of claim 11, further comprising:

providing corrected input values for sensor measurement errors using a filtering mechanism; and providing corrected input values for dynamic state errors of attitude and position using the filtering mechanism.

13. The computer-readable medium of claim 12, wherein using the filtering mechanism further comprises transitioning from at least one of the modes of operation depending on the condition of the data link received from the aircraft carrier.

14. The computer-readable medium of claim 12, wherein the third mode is decomposed as follows:

$$x_{float} = \begin{bmatrix} x_{fixed} \\ x_n \end{bmatrix}$$

$X_n$ is integer state, $$x_{float} = \begin{bmatrix} \delta \Delta R^E \\ \delta \Delta V^E \\ \delta \Delta A^E \\ \delta \Delta \nabla N_{WL} \end{bmatrix}$$

$\delta \Delta R^E$ is error in baseline vector from ship motion sensor to aircraft embedded GPS/INS (EGI) (relative position coordinatized in ECEF), $\delta \Delta V^E$ is error in rate of change of baseline vector as seen from Earth Centered Earth Fixed (ECEF) and coordinatized in ECEF (relative velocity vector), $\delta \Delta A^E$ is relative acceleration errors (rate of change of relative velocity vector as seen from ECEF and coordinatized in ECEF), $\delta \Delta \nabla N_{WL}$ is error in DD Wide Lane (WL) integer ambiguities.

15. The computer-readable medium of claim 10, wherein integrating the velocity of the aircraft carrier with the velocity of the aircraft comprises integrating the velocity in the earth centered, earth fixed frame.

16. The computer-readable medium of claim 15, further comprising:

providing corrected velocity input values for sensor measurement errors using a filtering mechanism; and providing corrected velocity input values for dynamic velocity state errors using a filtering mechanism.

17. The computer-readable medium of claim 16, wherein using the filtering mechanism further comprises transitioning from at least one of the modes of operation depending on the condition of the data link received from the aircraft carrier.

18. The computer-readable medium of claim 17, wherein transitioning from the at least one mode of operation includes transitioning from at least one of absolute difference, code differential, float, or fixed.

19. The computer-readable medium of claim 10, wherein constructing the reference trajectories for relative position and velocity further comprises interpolating the aircraft position and velocity to the nearest appropriate aircraft carrier measurement recording time.

20. The computer-readable medium of claim 19, further comprising differencing the aircraft position and velocity with the aircraft carrier position and velocity.

21. An on-board navigational system for an aircraft, the system comprising:

a first processor adapted to perform real-time computations necessary for recording absolute measurements of the aircraft's position and velocity, wherein the first processor is further adapted to integrate position and velocity measurements with respect to the aircraft;

a second processor adapted to perform real-time computations necessary for receiving position and velocity measurements from an aircraft carrier, wherein the second processor is further adapted to estimate position and velocity errors with respect to the aircraft, estimate position and velocity errors with respect to the aircraft carrier, and estimate the relative position and velocity between the aircraft carrier and the aircraft at a point forward in time to complete an autonomous shipboard landing;

one or more position sensors coupled to the first processor, the sensors adapted to detect the position of the aircraft;

one or more inertial sensors coupled to the first processor; the sensors adapted to detect the inertial movements of the aircraft; and a navigation avionics platform, coupled to both the first and second processors, wherein the platform is further adapted to provide ship state and GPS measurement data from the aircraft carrier to the second processor, and to receive relative navigation data from the second processor based on a previous ship state, wherein the second processor includes a relative navigation Kalman filter (RNKF) that operates in the following modes:

first mode where the relative navigation solution is computed by differencing absolute positions of the ship and aircraft, second mode where the relative navigation solution is computed in a relative navigation Kalman filter based on double differenced single frequency or narrow lane pseudo-range (code) measurements, third mode where the relative navigation solution is computed in the relative navigation Kalman filter based on double differenced single frequency or narrow lane code and double differenced single frequency or wide lane carrier measurements.

22. The system of claim 21, wherein the position and velocity errors with respect to the aircraft carrier includes acceleration errors and wherein the position and velocity errors with respect to the aircraft carrier includes dual frequency integer ambiguities.

23. The system of claim 21, wherein the position and velocity errors with respect to the aircraft includes attitude errors.

24. The system of claim 21, wherein the one or more position sensors include one or more position sensors of a GPS unit and wherein the one or more inertial sensors include one or more inertial sensors of an INS unit.

25. The system of claim 21, wherein the relative navigation data received from the second processor by the navigation avionics platform includes a relative position and velocity between the aircraft and the aircraft carrier based on a last known state of the aircraft carrier.

26. The system of claim 21, wherein transitions between modes 1-3 are determined based on condition of a data link between aircraft and carrier, fixed condition of DD integer ambiguities, and violation of a major position error tolerance (TOL).

27. The system of claim 26, wherein the third mode is decomposed as follows:

$$x_{float} = \begin{bmatrix} x_{fixed} \\ x_n \end{bmatrix}$$

$X_n$ is integer state, $$x_{float} = \begin{bmatrix} \delta \Delta R^E \\ \delta \Delta V^E \\ \delta \Delta A^E \\ \delta \Delta \nabla N_{WL} \end{bmatrix}$$

$\delta \Delta R^E$ is error in baseline vector from ship motion sensor to aircraft embedded GPS/INS (EGI) (relative position coordinatized in ECEF), $\delta \Delta V^E$ is error in rate of change of baseline vector as seen from Earth Centered Earth Fixed (ECEF) and coordinatized in ECEF (relative velocity vector), $\delta \Delta A^E$ is relative acceleration errors (rate of change of relative velocity vector as seen from ECEF and coordinatized in ECEF), $\delta \Delta \nabla N_{WL}$ is error in DD Wide Lane (WL) integer ambiguities.

28. An apparatus guiding the approach and landing of an aircraft, the apparatus comprising:

means for receiving navigation information from the aircraft;

means for receiving navigation information from an aircraft carrier;

means for integrating the navigation information from the aircraft with the navigation information from the aircraft carrier to determine a relative velocity and a relative position between the aircraft and the aircraft carrier; and based on a last known state of the aircraft carrier, means for estimating the relative velocity and the relative position at a point forward in time to complete an autonomous shipboard landing, wherein the means for integrating further:

determines a combined GPS code based an uncorreted GPS code and carrier double differences combined with a predicted GPS code and carrier double differences and the received navigation information from the aircraft and the aircraft carrier;

calculates a baseline relative position vector based on the received navigation information from the aircraft and the aircraft carrier;

calculates a double difference code based on the baseline relative position vector;

calculates a relative position and velocity vector based on the double difference code, the combined GPS code and the received navigation information from the aircraft and the aircraft carrier; and stabilizes the relative position and velocity vector, wherein the estimates of the stabilized relative position and velocity vector are computed by differencing absolute positions of the ship and aircraft in a first operational mode, wherein the estimates of the stabilized relative position and velocity vector are computed using a relative navigation Kalman filter based on one of double differenced single frequency or narrow lane pseudo-range (code) measurements in a second operational mode, and wherein the estimates of the stabilized relative position and velocity vector are computed using the relative navigation Kalman filter based on double differenced single frequency or narrow lane code and double differenced single frequency or wide lane carrier measurements in a third operational mode.

29. The apparatus of claim 28, wherein means for receiving navigation information from the aircraft comprises means for receiving GPS/INS measurement data from an on-board navigation system and wherein means for receiving navigation information from an aircraft carrier comprises means for receiving a broadcast of GPS/INS measurement data from the aircraft carrier.

30. The apparatus of claim 28, wherein means for integrating the navigation information from the aircraft with the navigation information from the aircraft carrier to determine a relative velocity and a relative position between the aircraft and the aircraft carrier comprises:

means for constructing velocity and position vectors of the aircraft;

means for constructing velocity and position vectors of the aircraft carrier;

means for differencing the velocity vector of the aircraft with the velocity vector of the aircraft carrier; and means for differencing the position vector of the aircraft with the position vector of the aircraft carrier.

31. The apparatus of claim 28, wherein means for estimating the relative velocity and the relative position forward in time comprises:

means for propagating relative velocity and relative position vectors forward in time at the same rate as signals are received from the aircraft carrier; and means for aiding relative velocity and relative position vectors forward in time at the same rate as GPS signals are recorded by the aircraft and the aircraft carrier.

* * * * *

UNITED STATES PATENT AND TRADEMARK OFFICE
CERTIFICATE OF CORRECTION

PATENT NO. : 7,474,962 B2 Page 1 of 1
APPLICATION NO. : 11/180295
DATED : January 6, 2009
INVENTOR(S) : James Waid et al.

It is certified that error appears in the above-identified patent and that said Letters Patent is hereby corrected as shown below:

Col. 20, line 48: Delete the second occurrence of the word "the" before the word "aircraft".

Signed and Sealed this

Fourteenth Day of April, 2009

JOHN DOLL
*Acting Director of the United States Patent and Trademark Office*